United States Patent
Kar et al.

(10) Patent No.: US 10,379,512 B2
(45) Date of Patent: Aug. 13, 2019

(54) MONITORING AND CONTROL SYSTEM USING CLOUD SERVICES

(71) Applicant: Honeywell International Inc., Morris Plains, NJ (US)

(72) Inventors: Chinmaya Kar, Karnataka (IN); Christober Vinoth Raj, Karnataka (IN); Vishwanath Raghavendra Chamarajanagar, Karnataka (IN); Chirag Solanki, Bangalore (IN); Kushagra Thakur, Bihar (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/533,194

(22) PCT Filed: Dec. 5, 2014

(86) PCT No.: PCT/US2014/068736
§ 371 (c)(1),
(2) Date: Jun. 5, 2017

(87) PCT Pub. No.: WO2016/089416
PCT Pub. Date: Jun. 9, 2016

(65) Prior Publication Data
US 2018/0004180 A1   Jan. 4, 2018

(51) Int. Cl.
*G06F 8/65* (2018.01)
*G05B 19/042* (2006.01)
(Continued)

(52) U.S. Cl.
CPC ......... *G05B 19/0426* (2013.01); *G05D 19/02* (2013.01); *G06F 8/65* (2013.01);
(Continued)

(58) Field of Classification Search
CPC ............ G05B 19/0426; G05B 23/0286; G05B 23/0275; G05B 2219/23304; G05D 19/02;
(Continued)

(56) References Cited

U.S. PATENT DOCUMENTS 4,399,548 A    8/1983  Castleberry
5,245,552 A *  9/1993  Andersson ........... G10K 11/178
                                                    700/280

(Continued)

FOREIGN PATENT DOCUMENTS

CN    103634368 A    3/2014
CN    103634369 A    3/2014
(Continued)

OTHER PUBLICATIONS

"International Application Serial No. PCT/US2014/068736, International Search Report dated Jul. 30, 2015", 4 pgs.
(Continued)

*Primary Examiner* — Brian W Wathen
*Assistant Examiner* — Brian T McMenemy
(74) *Attorney, Agent, or Firm* — Schwegman Lundberg & Woessner, P.A.

(57) ABSTRACT

A system includes a computer processor located within a cloud system. The system receives data from a sensor associated with an industrial or home automation control application. The sensor is configured to monitor a first condition of a device. The computer processor analyzes the data, and transmits a software update or software download from the cloud system to the industrial or home automation control application based on the data analysis.

9 Claims, 9 Drawing Sheets

(51) Int. Cl.
  *G06F 9/445*   (2018.01)
  *G06F 11/07*   (2006.01)
  *G05D 19/02*   (2006.01)
  *H04L 12/24*   (2006.01)
  *H04L 12/26*   (2006.01)
  *G05B 19/418*  (2006.01)
  *H04L 29/08*   (2006.01)
  *G05B 23/02*   (2006.01)

(52) U.S. Cl.
  CPC ...... *G06F 9/44505* (2013.01); *G06F 11/0736* (2013.01); *G06F 11/0748* (2013.01); *G06F 11/0793* (2013.01); *H04L 41/082* (2013.01); *H04L 43/0817* (2013.01); *G05B 23/0275* (2013.01); *G05B 23/0286* (2013.01); *G05B 2219/23304* (2013.01); *H04L 67/10* (2013.01)

(58) Field of Classification Search
  CPC .... G06F 8/65; G06F 9/44505; G06F 11/0736; G06F 11/0748; G06F 11/0793; H04L 41/082; H04L 43/0817
  See application file for complete search history.

(56) References Cited

U.S. PATENT DOCUMENTS

| | | | | |
|---|---|---|---|---|
| 5,528,503 | A * | 6/1996 | Moore | G05B 19/41865 700/95 |
| 7,928,833 | B2 | 4/2011 | Bibelhausen et al. | |
| 7,970,830 | B2 | 6/2011 | Staggs et al. | |
| 8,745,617 | B1 | 6/2014 | Stekkelpak et al. | |
| 9,477,735 | B2 | 10/2016 | Baik | |
| 2003/0014498 | A1 | 1/2003 | Kreidler et al. | |
| 2005/0271207 | A1 | 12/2005 | Frey | |
| 2006/0150021 | A1 | 7/2006 | Traskov et al. | |
| 2006/0224250 | A1 * | 10/2006 | Callaghan | G05B 19/054 700/1 |
| 2007/0294691 | A1 * | 12/2007 | Park | G06F 9/445 718/100 |
| 2010/0030492 | A1 * | 2/2010 | Kar | F16C 19/52 702/39 |
| 2011/0258618 | A1 | 10/2011 | Capuozzo et al. | |
| 2011/0289493 | A1 | 11/2011 | Keefe et al. | |
| 2012/0303150 | A1 * | 11/2012 | Krishnaswamy | G05B 17/02 700/110 |
| 2013/0212160 | A1 | 8/2013 | Lawson et al. | |
| 2013/0271286 | A1 * | 10/2013 | Quan | G08B 5/00 340/691.6 |
| 2014/0059536 | A1 | 2/2014 | Hiratsuka et al. | |
| 2014/0244051 | A1 * | 8/2014 | Rollins | B01F 3/04078 700/282 |
| 2014/0336791 | A1 * | 11/2014 | Asenjo | G05B 13/026 700/44 |
| 2014/0336795 | A1 | 11/2014 | Asenjo et al. | |
| 2014/0337429 | A1 | 11/2014 | Asenjo et al. | |
| 2016/0041539 | A1 * | 2/2016 | Kemp | G05B 15/02 700/80 |

FOREIGN PATENT DOCUMENTS

| | | |
|---|---|---|
| CN | 104142660 A | 11/2014 |
| CN | 107111590 | 8/2017 |
| EP | 1304463 | 4/2003 |
| EP | 2701085 A1 | 2/2014 |
| WO | 2012032137 | 3/2012 |
| WO | WO-2016089416 A1 | 6/2016 |

OTHER PUBLICATIONS

"International Application Serial No. PCT/US2014/068736, Written Opinion dated Jul. 30, 2015", 5 pgs.

Mansour, Assaf H, et al., "Sensor Based Home Automation and Security System", Instrumentation and Measurement Technology Conference (I2MTC), (May 13-16, 2012), 722-727.

"International Application Serial No. PCT/US2014/068736, International Preliminary Report on Patentability dated Jun. 15, 2017", 7 pgs.

"The Web of Things", Tridium White Paper, (Sep. 2009), 8 pgs.

"Internet of things comes alive through smart objects interoperability", [online]. (C) 2016 Ericsson [retrieved on Jun. 29, 2017]. Retrieved from the Internet: URL: https://www.ericsson.com/research-blog/internet-of-things/internet-things-comes-alive-smart-objects-interoperability/, (Apr. 10, 2012), 8 pgs.

"Embedded Systems (are a great model) for future Cloud Computing UI design", [online]. (c) 2016 The Art of Service [archived on Apr. 7, 2016]. Retrieved from the Internet: URL: https://web.archive.org/web/20160407014123/http://artofservice.com.au/embedded-systems-are-a-great-model-for-future-cloud-computing-ui-design/, (2016), 2 pgs.

"Introduction to IP in Commercial Buildings", IPSO Alliance Smart Building Workgroup, (2010), 9 pgs.

Baldoni, Roberto, "Designing Highly Available Repositories for Heterogeneous Sensor Data in Open Home Automation Systems", IFIP International Workshop on Software Technologies for Embedded and Ubiquitous Systems (SEUS 2009), (2009), 144-155.

Considine, Toby, "Big Data, Buildings, and the Internet of Things", [online]. [archived on Sep. 28, 2015]. {Retrieved From the Internet: URL: https://web.archive.org/web/20150928031257/http://www.automatedbuildings.com/news/apr12/columns/120330065808considine.html, (Apr. 2012), 2 pgs.

Lee, Kevin, "Extending Sensor networks into the Cloud using Amazon Web Services", 2010 IEEE International Conference on Networked Embedded Systems for Enterprise Applications, (2010), 7 pgs.

Lee, Kevin, "System Architecture Directions for Tangible Cloud Computing", 2010 First ACIS International Symposium on Cryptography, and Network Security, Data Mining and Knowledge Discovery, E-Commerce and Its Applications, and Embedded Systems, (Oct. 2010), 258-262.

Pfeiffer, Olaf, "Embedded Networking with CAN and CANopen", Copperhill Technologies Corporation, Greenfield, MA, (2003), 553 pgs.

Rogerson, Steve, "Device lets companies monitor machine health", [online]. [retrieved Jun. 29, 2017]. Retrieved from the Internet: URL: www.m2mnow.biz/2011/06/11/1550-device-lets-companies-monitor-machine-health/, (Jun. 11, 2011), 1 pg.

Vermesan, Ovidiu Dr., "The Internet of Things", (2011), 9-52.

"European Application Serial No. 14907458.5, Partial Supplementary European Search Report date Jul. 27, 2018", 10 pgs.

"Chinese Application Serial No. 201480084288.3, Office Action dated Apr. 18, 2018", W English Translation, 17 pgs.

"Chinese Application Serial No. 201480084288.3, Office Action dated Nov. 6, 2018", (w/ English Translation), 13 pgs.

"Chinese Application Serial No. 201480084288.3, Response filed Jan. 21, 2019 to Office Action dated Nov. 6, 2018". (w/ English Translation of Claims), 8 pgs.

"Chinese Application Serial No. 201480084288.3, Response filed Sep. 13, 2018 to Office Action dated Apr. 18, 2018", W/English Translated Claims, 12 pgs.

"European Application Serial No. 14907458.5, Extended European Search Report dated Nov. 22, 2018", 12 pgs.

Anonymous, "Installation (computer programs)—Wikipedia", [Online] Retrieved from the internet<URL:https://en.wikipedia.org/w/index.php?title=Installation_(computer_programs)&oldid=566721510>, (Aug. 1, 2013), 6 pgs.

"European Application Serial No. 14907458.5, Communication Pursuant to Article 94(3) EPC dated Mar. 1, 2019", 5 pgs.

"Chinese Application Serial No. 201480084288.3, Decision of Rejection dated Apr. 4, 2019", w/ English Translation, 13 pgs.

"European Application Serial No. 14907458.5, Response filed Apr. 16, 2019 to Communication Pursuant to Article 94(3) EPC dated Mar. 1, 2019", 13 pgs.

(56) References Cited

OTHER PUBLICATIONS

"European Application Serial No. 14907458.5, Communication Pursuant to Article 94(3) EPC dated Jun. 6, 2019", 4 pgs.

* cited by examiner

| PROPERTY | FFT | STFT | WAVELET | EMD/HHT |
|---|---|---|---|---|
| BASIS | A PRIORI | A PRIORI | A PRIORI | ADAPTIVE |
| FREQUENCY RESOLUTION | FREQUENCY RESOLUTION IS CONSTANT FOR THE SIGNAL | BOTH TIME AND FREQUENCY RESOLUTION CAN'T BE ACHIEVED SIMULTANEOUSLY | LOW RESOLUTION IN THE HIGH FREQUENCY REGION AND LARGE RESOLUTION AT LOWER FREQUENCIES | LOCAL CERTAINTY |
| PRESENTATION | ENERGY - FREQUENCY | ENERGY - TIME FREQUENCY | ENERGY - TIME SCALE | ENERGY - TIME INSTANTANEOUS FREQUENCY |
| NON LINEAR | NO | NO (PIECEWISE LINEARITY ASSUMED) | YES | YES |
| NON STATIONARY | NO | NO (PIECEWISE STATIONARITY ASSUMED) | YES | YES |
| COMPUTATIONAL COMPLEXITY | INVOLVES COMPLEX MULTIPLICATIONS AND ADDITIONS | INVOLVES COMPLEX MULTIPLICATIONS AND ADDITIONS | DEPENDS UPON THE MOTHER WAVELET (HUGE COMPUTATIONS ARE INVOLVED) | COMPLEXITY OWES MUCH TO THE USE OF CUBIC SPLINE INTERPOLATION |
| THEORETICAL BASE | THEORY COMPLETE | THEORY COMPLETE | THEORY COMPLETE | EMPIRICAL |
| END EFFECTS | NOT APPLICABLE | END EFFECT EXISTS | END EFFECT IS SEVERE | END EFFECT DEPENDS ON TYPE OF INTERPOLATION TECHNIQUES |

MONITORING AND CONTROL SYSTEM USING CLOUD SERVICES

This application is a U.S. National Stage Filing under 35 U.S.C. 371 of International Patent Application Serial No. PCT/US2014/068736, filed Dec. 5, 2014, and published on Jun. 9, 2016 as WO 2016/089416 A1, the benefit of priority of which is claimed hereby and which is incorporated herein by reference in its entirety.

TECHNICAL FIELD

The present disclosure relates to a system that automatically downloads and/or updates software based on priority using cloud services. The software can be embedded software and/or software installed in an industrial or home system application. The present disclosure further relates to a system for journal bearing monitoring and control using cloud services, for example, the diagnosis of the condition of equipment such as a compressor.

BACKGROUND

Embedded devices are resource constrained systems (e.g., memory, speed) that are expected to deliver the needs of a specific application. To mitigate the memory limitation, the functionality of the embedded device can be extended by attaching non-volatile memory (e.g., via a universal serial bus (USB)) to the embedded system and recognizing the non-volatile memory by means of firmware. If the memory constraints are solved, different applications can run on the same embedded device by making use of sensors and actuators as shared resources. It has been proposed to use cloud technology as an extensible computation resource (e.g., for executing an intensive non-real time application) and a sensor as a shared resource for monitoring applications.

More specifically, to mitigate the memory limitation, Giuseppe (US Patent Pub. No. 2011/0258618) extended the functionality of the embedded device by attaching non-volatile memory (USB) to the embedded system and recognizing it by means of firmware. If memory constraints are solved, different applications can run on the same embedded device by making use of sensors and actuators as shared resources. Lee (System Architecture Directions for Tangible Cloud Computing" October 2010; MEE CDEE Page(s):258-262) has proposed to use a cloud as an extensible computation resource and sensor as a shared resource for monitoring applications. The idea of executing process intensive non real-time applications in a cloud is given by McLaughlin (U.S. Pat. No. 7,970,830). Usage of cloud services for real-time systems (Hard/Soft) which can include control algorithms to activate an actuator is not described in the above patents or literature.

Additionally, in almost all applications actuators are used and it requires a unique control mechanism unlike the sensor parameters, hence using cloud services for control mechanism can extend the horizon of cloud. Unfortunately, executing the control mechanism as a cloud service is not practical due to the non-deterministic nature of the cloud infrastructure. In addition to that problem, there is a need to download embedded software that requires updates to add features or correct errors. Some updates are costly since they can be programmed only by OEM's or dealers. Derrick (U.S. Patent Pub. No. 20110289493) has proposed to use a portable device that provides embedded software to the embedded system. However, this approach requires the need for maintenance of a device just for software updates. Another common problem encountered in the embedded system is that it cannot be stopped for debugging purposes. Adrain (U.S. Patent Pub. No. 20060150021) has disclosed an analysis device to monitor the behavior of the embedded system in real time. It is disadvantageous to use such a system since the analysis device memory should at least have the same bandwidth as the embedded device. With the advancement in embedded processors in terms of memory capacity and speed, the analysis device has to be replaced often to meet the memory requirement.

As an example, an embedded device can be associated with a gas turbine. A gas turbine of any power or process plant has a number of components such as journal bearings, rotors, shafts, compressors (and blades at various stages), combustors, nozzles, buckets, and casings. The journal bearing supports the moving rotor. The journal bearing has a bearing, journal, a rotor, a shaft, and lubricating oil. The lubricating oil, which is subject to high pressures, has a high viscosity and can withstand high pressure so that that it can take up the large rotor load during a state of rest. Additionally, during the rotation of the rotor, the lubricating oil is squeezed by the rotor and the rotor moves to the right (for a counterclockwise load). Since there is a large temperature increase during such operation, the viscosity of the oil decreases and hence the separation between the journal and the bearing decreases. This decrease in separation causes large scale friction and the bearing degrades. There are also various other failure modes of journal bearings such as oil whirl, oil whip, and rotor unbalance. These failure modes, if not monitored, can be catastrophic and can cause substantial loss to the gas turbine and the plant.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Overview

The above-discussed problems can be solved by a single soft real time system using a cloud as proposed below. An objective is to provide an intelligent soft real time system that downloads the firmware/embedded software, in particular the control software based on the need with the help of cloud services. Another objective is to compile and store the required control software as byte code in the cloud for facilitating development of a system across multiple sites with ease. Another objective is to upload the internal system condition of the embedded device into the cloud to evaluate the free memory required to run the control algorithm. These data can also be used to measure the performance or debug the embedded system from a remote place. Another objective is to provide a system that includes a sensor and an actuator as shared resources by triggering it based on the data analytics software that reduces false alarms. A further objective is to provide analytic/feature software updates that can be downloaded dynamically with the help of cloud services. This will help in uploading any change in requirement of analytics. This will help in providing software/analytics as a service in the embedded system as well.

In general, an embodiment is applicable to any industrial or home automation applications that make use of sensors and actuators. Even though this disclosure relates to memory constrained devices, DCS systems like Experion PKS can make use of the concept of downloading the software based on the need which reduces the complexity of the system by increasing the involvement of the third party services for the system development.

Sensor data can be reused in multiple applications for little additional cost. The present disclosure refers to condition monitoring and control of compressors as one example but is not restricted to this application. An example of condition monitoring is as follows: the accelerometer mounted on the drive shaft bearing assembly of a compressor can be used to monitor the compressor surge as suggested in Castleberry (U.S. Pat. No. 4,399,548). The same accelerometer can be reused to identify the bearing fault as proposed by Chinmaya Kar (U.S. Patent Pub. No. 20100030492). However the control algorithms/parameters needed for these applications have to be different since the type of actuators and means of providing inputs are different. Hence downloading the required algorithms/parameters based on the need reduces the complexity of the system and increases the involvement of the third party's for the development of the system.

Figure 1:
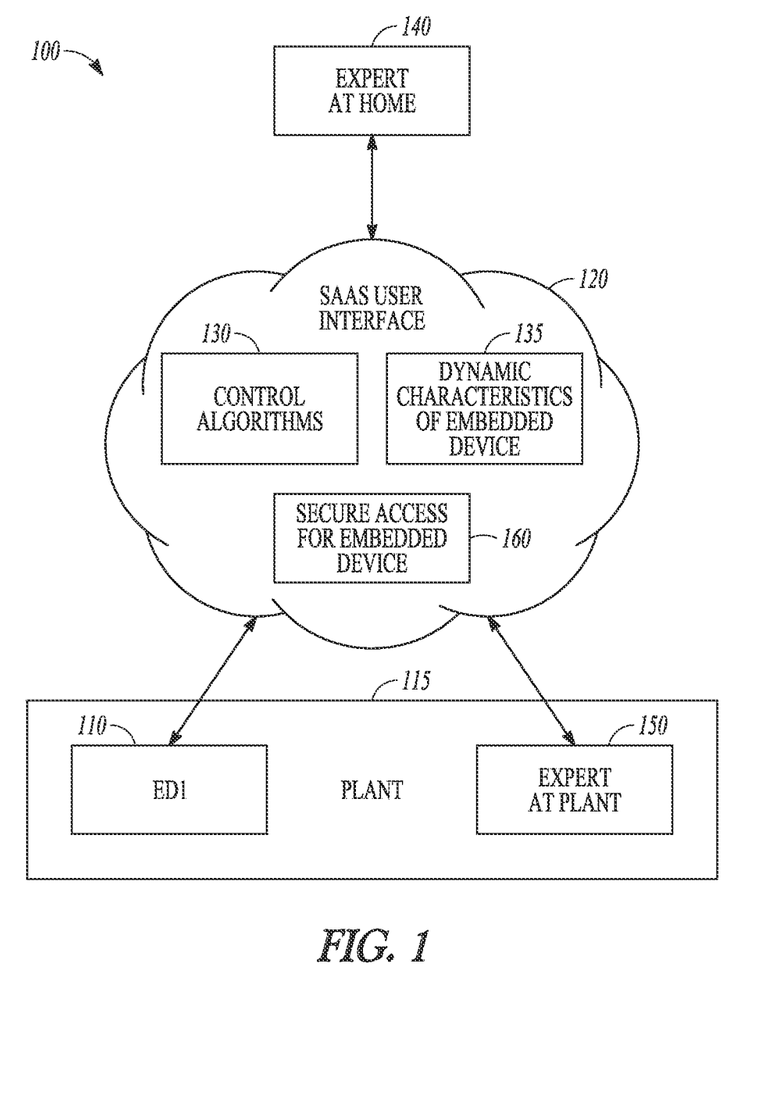
FIG. 1 is a block diagram of a monitoring and control system with embedded devices.

Turning to the figures, FIG. 1 is the overview of the monitoring and control system that has several embedded devices at the plant and an SaaS User Interface that can check the memory layout of the particular device and download the control algorithm dynamically based on the priority of the application. Here the term "dynamic" refers to the updating of firmware/algorithms to the embedded device without resetting the device. The expert at home can provide the basic control algorithm as service and the expert at the plant can modify/alter it based on his need. Further a secure access can be provided to the system by using chaotic digital signatures based on the logistic equation as proposed in Helmut (U.S. Patent Pub. No. 20050271207). The block diagram of the system is described in FIG. 2. The emergence of the Internet has shifted the idea of fixed-function embedded devices towards more open system offering some form of network connectivity. In general, Java is used to provide Internet-based technologies into embedded devices. With Java, developers can target a platform-independent APIs and migrate their applications to different devices without recompilation. These API's interact with a real-time operating system to run the application.

Detailed Examples

Usage of cloud services for real-time systems, both hardware and software, that can include control algorithms to activate an actuator, is not disclosed in prior systems. Consequently, this disclosure relates to a system that automatically updates the analytics and/or features of software in an industrial or home automation control application by using cloud services. The software can be embedded software or software installed in a system.

An embodiment includes a single software-based real time system that uses cloud technology. In this disclosure, cloud technology, cloud computing, or simply "the cloud" refers to the delivery of computing as a service rather than a product (via the purchase of hardware and software), whereby shared resources, software, and information are provided to computers and other devices as a utility over a network. The resources can be dynamically allocated and de-allocated. Specifically, an embodiment provides an intelligent and software-based real time system that downloads embedded firmware and/or software from the cloud, and in particular, the control software. The downloading is based on need and further involves the use of cloud services. Additionally, an embodiment compiles and stores the required control software as byte code in the cloud for facilitating development of a system across multiple sites. An embodiment further uploads an internal system condition of the embedded device into the cloud to evaluate the free memory required to run the control algorithm. These data can also be used to measure the performance or debug the embedded system from a remote place. An embodiment also provides a system that includes sensors and actuators as shared resources by triggering the system based on data analytics software, which results in a reduction in false alarms. An embodiment still further provides analytics and feature software updates that can be downloaded dynamically with the use of cloud services. This helps in uploading any change in requirements of analytics. This further helps in providing software and/or analytics as a service in the embedded system as well.

In general, embodiments are applicable to any industrial or home automation/control applications that make use of sensors and actuators. In short, embodiments use the concept of downloading software (to an embedded device) based on need, which reduces the complexity of the system by increasing the involvement of third party services for system development.

One aspect of an embodiment is that sensor data can be reused in multiple applications for little additional cost. To illustrate this, the present disclosure refers to condition monitoring and the control of compressors as one example. The disclosure however is not limited to such an application.

An example of condition monitoring is as follows. An accelerometer mounted on the drive shaft bearing assembly of a compressor can be used to monitor compressor surge. The same accelerometer can be reused to identify a bearing fault. However, the control algorithms and/or parameters needed for these applications are different because the type of actuators and means of providing inputs are different. Consequently, downloading the required algorithms and/or parameters based on need reduces the complexity of the system and increases the involvement of a third party for the development of the system.

FIG. 1 is a block diagram of a monitoring and control system 100 that has several embedded devices 110 at an industrial plant 115. The system 100 includes an SaaS (Software as a Service) user interface 120 that can check the memory layout of an embedded device 110 and that can dynamically download a control algorithm 130 based on the priority and/or needs of the application. The term "dynamic" refers to the update of firmware/algorithms of the embedded device 110 without resetting the device 110. The SaaS user interface 120 also has access to dynamic characteristics 135 of the embedded devices. The expert at home 140 can provide the basic control algorithm as a service and the expert at the plant 150 can modify or alter the basic algorithm based on a need. Additionally, security of the system 100 can be handled by a secure access module 160.

Figure 2:
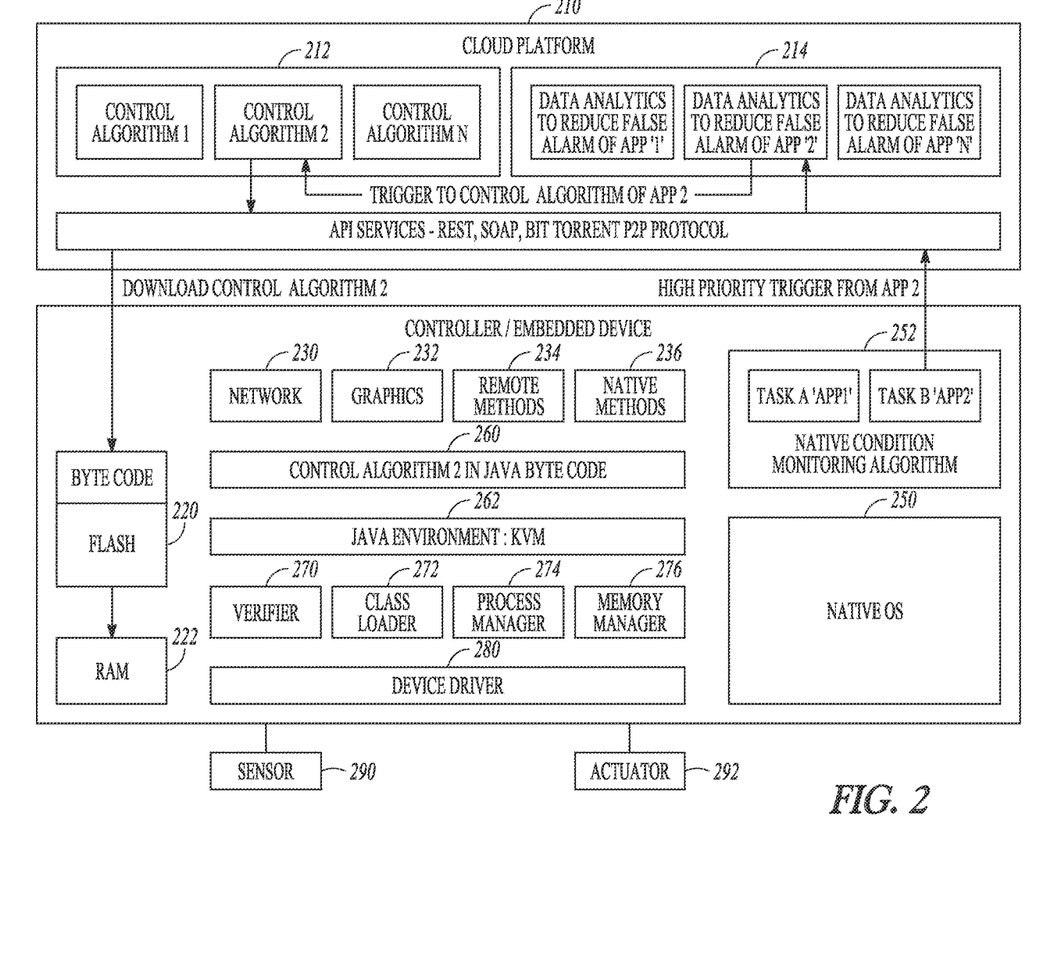
FIG. 2 is a block diagram of an SaaS (Software as a Service) user interface and an embedded device.

FIG. 2 is a block diagram of the SaaS user interface 120 and embedded device 110 of FIG. 1. FIG. 2 illustrates a cloud platform 210. The cloud platform 210 includes a plurality of control algorithms 212. Each control algorithm 212 is for a particular embedded device or a particular type of embedded device, and further for a particular control aspect of the embedded device. The cloud platform 210 further includes data analytics modules 214. The data analytics modules 214 help reduce the number of false alarms for its associated embedded device by analyzing data received from the embedded device.

A command causes a control algorithm to be downloaded from the cloud platform 210 to an embedded device 110. As further illustrated in FIG. 2, the control algorithm is stored as byte code in flash memory 220 or RAM 222. More specifically, the control algorithm is stored as Java byte code 260 in Java environment 262. The embedded device 110 can further include a network module 230, a graphics module 232, a remote methods module 234, and a native methods module 236. The embedded device 110 can further include a native operating system 250, and a native condition monitoring module 252. The embedded device 110 further includes a verifier 270, a class loader 272, a process manager 274, and a memory manager 276. A device driver 280 controls communications between the embedded device 110 and a sensor 290 and an actuator 292.

As can be gleaned from FIG. 2, the emergence of the Internet has shifted the idea of fixed-function embedded devices towards a more open system that offers some form of network connectivity. In general, Java is used to provide Internet-based technologies into embedded devices. With Java, developers can target a platform-independent application program interface (API) and migrate their applications to different devices without recompilation. These ApI's interact with a real-time operating system to run the application.

Figure 3:
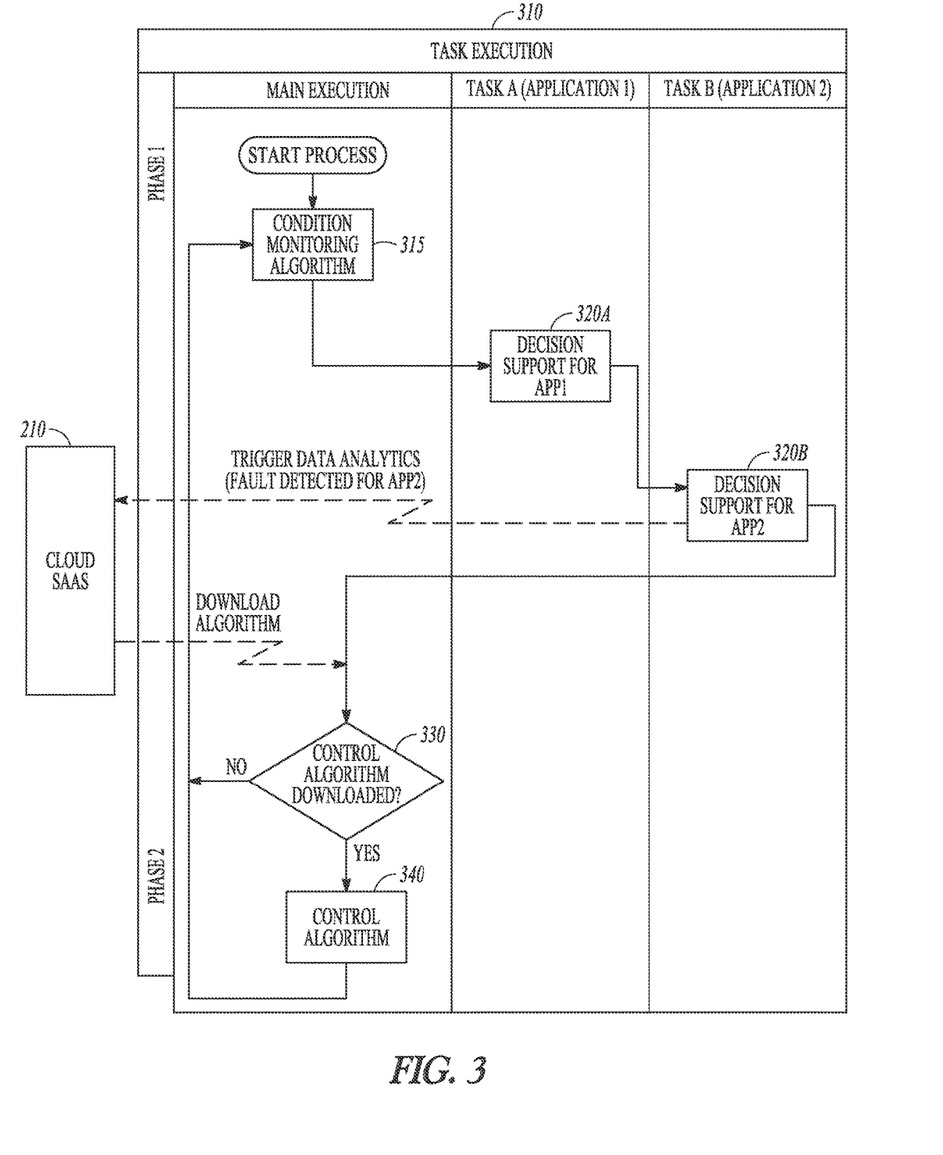
FIG. 3 is a block diagram illustrating the downloading of an algorithm from an SaaS cloud when a fault is detected in an application.

FIG. 3 is a block diagram illustrating the downloading of an algorithm from an SaaS cloud (cloud platform 210) when a fault is detected in an application (embedded device 110). In this example, the embedded device includes a task execution 310. The task execution includes a condition monitoring algorithm 315. The condition monitoring algorithm can include a decision support system 320A and 32013 for a first application and a second application respectively. If the cloud platform 210 detects a fault in one or more of the applications (330), the cloud platform 210 can download a new or updated control algorithm at 340.

Figure 4:
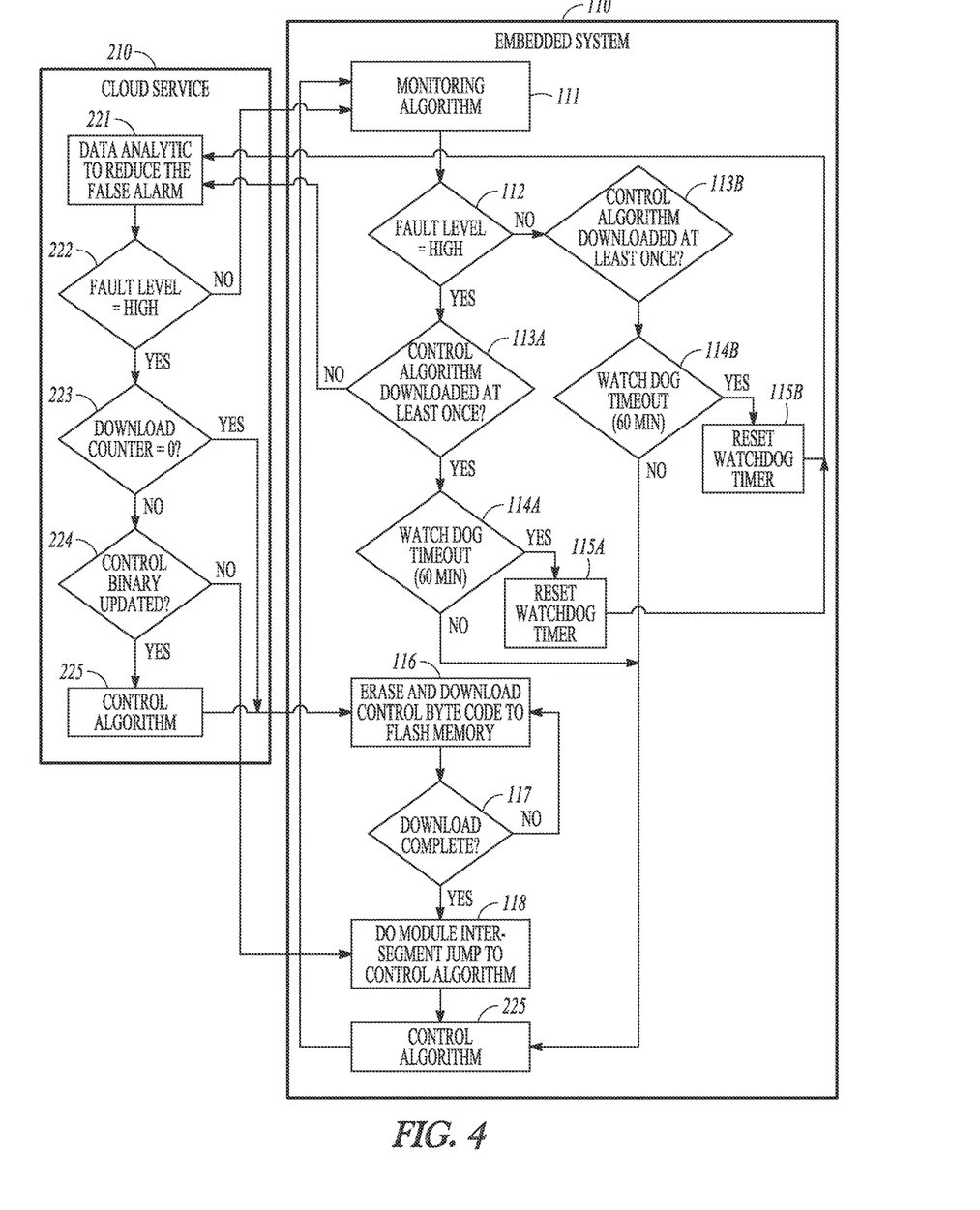
FIG. 4 is a block diagram illustrating data analytics and fault processing between an SaaS cloud and an embedded device.

FIG. 4 is a block diagram illustrating data analytics and fault processing between an SaaS cloud (210) and an embedded device (110). In an embodiment, the cloud service 210 includes a data analytics module 221, a fault level decision module 222, a software download counter 223, a control binary decision module 224, and control algorithms 225. The data analytics module 221 communicates with a monitoring algorithm 111 in the embedded device 110, which can reduce false alarms from the embedded device 110. The embedded device further includes a fault level decision module 112. At 113A and 113B, the embedded system determines if the control algorithm has been downloaded at least once. If it has not, control is passed back to the data analytics module 221 in the cloud service 220. If it has, and if a watch dog timer has not expired (114A, 114B), the timer is reset (115A, 115B) and control is passed back to the data analytics module 221 in the cloud service 210.

If the data analytics module 221 triggers the downloading of a control algorithm (225), byte code for the control algorithm is downloaded to flash memory (220) at 116. After the download is complete (117), control is transferred to the control algorithm 225 at 118.

In an embodiment, the SaaS user interface 120 and embedded device 110 can be used in connection with a monitoring and control system for industrial equipment. In a particular example, the SaaS user interface 120 and embedded device can function as a monitoring and control system for journal bearings of gas turbines.

Figure 5:
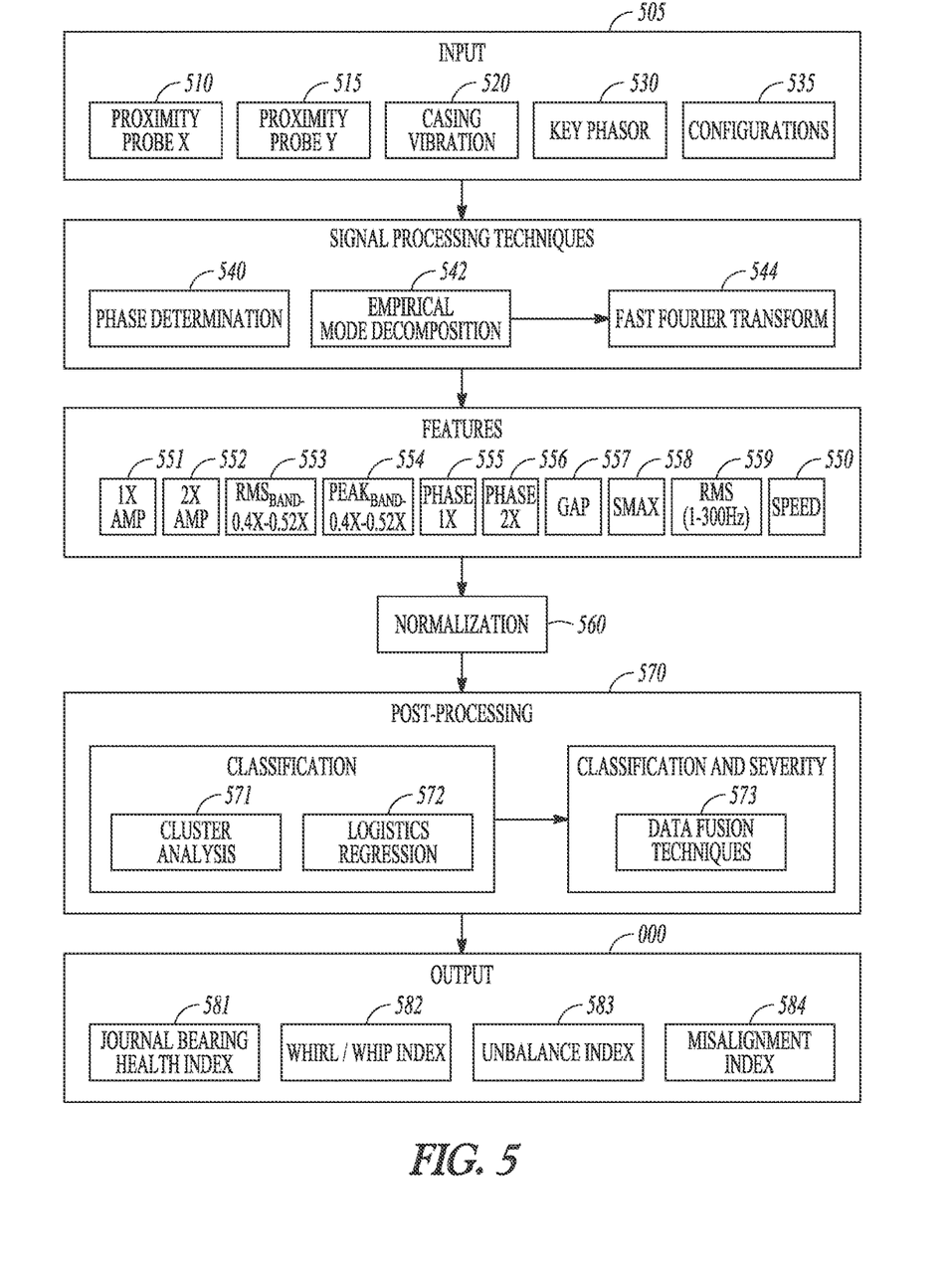
FIG. 5 illustrates a framework for monitoring and controlling journal bearings within a compressor.

FIG. 5 illustrates a framework for monitoring and controlling journal bearings within a compressor. The input 505 from the embedded device 110 can include input from one or more proximity probes (510, 515), a casing vibration sensor 520, a key phasor sensor 530, and a configuration module 535. This input can be processed via one or more of a phase determination 540, an empirical mode decomposition 542, and a fast fourier transform 544. Features of the framework include one or more amplifiers (551, 552), a band root mean square module (RMS) 553, a band peak module 554, one or more phase modules (555, 556), a gap module 557, a Smax module 558, a second RMS module 559, and a speed module 550. The output from the features module is provided to a normalization module 560, which normalizes the data for the post processing module 570. The post processing module 570 classifies and determines the severity of the data via cluster analysis (571), logistics regression (572), and/or data fusion (573). The output module 580 determines a journal bearing index 581, a whirl/whip index 582, an unbalance index 583, and a misalignment index 584.

The configurations 535 of the journal bearing (i.e., inputs) useful for its monitoring are as follows. The rotor diameter is an input. The diametral clearance (R) is an input. The diametral clearance is the difference between the bearing diameter and the journal diameter. The ratio between the measured maximum displacement and the diametral clearance is a determinant factor of large vibration of the rotor. This tolerant factor to this ratio also depends on the speed of the rotor. The rotor inertia is an input. Rotor weight that reflects the rotor inertia may play an important role in normalizing the vibration of the rotor.

The monitoring and control of the journal bearing involves several processing techniques. Requirements of such algorithms are as follows. First, the algorithms should be able to find various frequency components of the vibration signal so that the failure modes can be separated from each other. This will facilitate proper tracking of these frequencies. Techniques that can be used include Fast Fourier Transform (FFT), Short Time Fourier Transform (STFT), Wigner Ville Decomposition (WVD), and scalogram of wavelet transform.

Second, the high frequency noise should be separated from the required lower frequencies so that the signal becomes noise free. A number of techniques could be used for this processing such as wavelet transform, blind convolution technique, empirical mode decomposition, and Hilbert Huang transform.

Third, the algorithms should be able to separate the effect of other components from the frequency content of a particular component in a system. For example, the effect of a compressor blade should be removed from the effect of its associate shaft while diagnosing the failure of journal bearings. There are a number of signal processing techniques that can be used for such purposes such as envelop detection, amplitude modulation, frequency/phase demodulation, empirical mode decomposition, wavelet transform, and Hilbert Huang transform.

Fourth, the algorithms should be able to distinguish a faulty journal bearing from normally operating journal bearings using ISO and API standards, statistics, and rules.

Fifth, the algorithms should be able to distinguish or classify the failure modes of the embedded devices by identifying the unique frequency characteristics of each failure mode. The unique frequency characteristics can be obtained from rules in the vibration domain of the journal bearing. For example, an oil whirl or oil whip failure of the journal bearing can be tracked by trending the energy in the frequency region of 0.4×-0.5× of the rotating shaft speed.

Sixth, the algorithms should be able to quantify the severity of the failure mode. This can be accomplished using simple statistics like the root mean square, the maximum peak of a frequency band, or finding a failure mode indicator or machine health indicator by fusing various such statistics. The data fusion will help in integrating the advantages of each and every statistic. However, it needs complete domain knowledge and a lot of experimentation to provide and test the rules and their thresholds/limits.

Seventh, since there are a number of features with simple/ complex relationship amongst themselves, the algorithms need to fuse all these features to form a simple health degradation indicator. This will facilitate an easy interpretation of the level of degradation that has happened to the machine or its components.

Eighth, the algorithms should have the flexibility and ability to integrate a user choice/experience on various limits to the features and rules to combine the features.

Ninth, the algorithms should not use an extensive amount of computation time (since they are embedded into the hardware). A wireless monitoring system should not be burdened with the transmission of large amounts of data to a server. Therefore, some computations should be performed at the monitoring system level. Therefore, algorithms that take up less computation time should be used. Additionally, the combination of the active control system and monitoring system requires faster performance from the algorithms.

Figure 6:
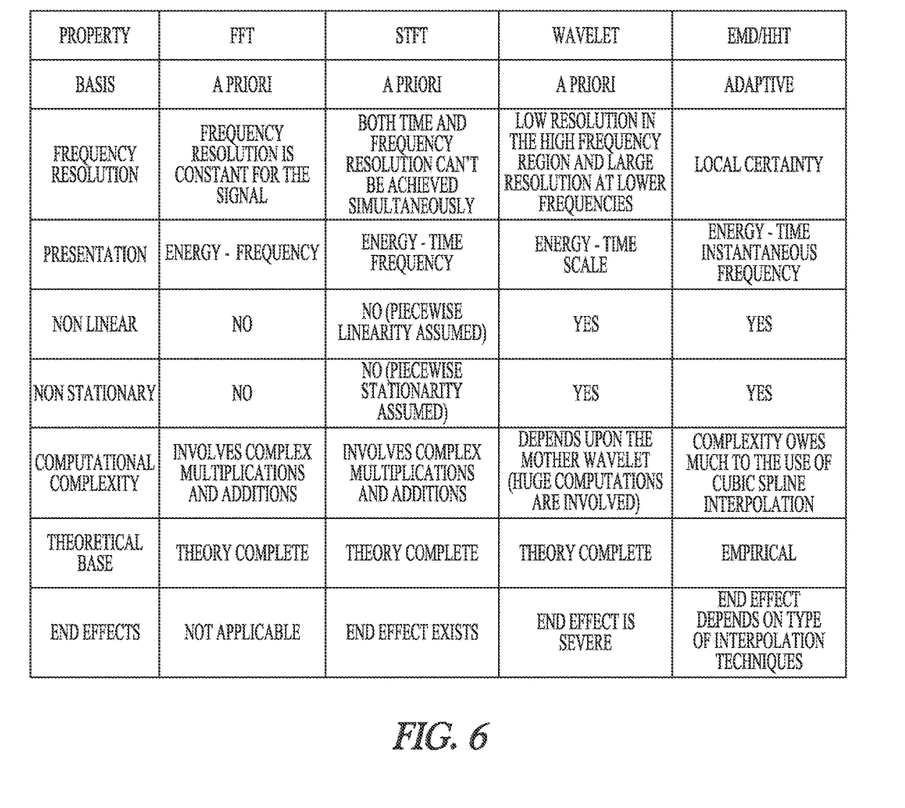
FIG. 6 is a table listing several algorithms and techniques that can be used in monitoring and controlling a process such as monitoring a journal bearing.

Most of the above-noted desired features of the algorithms are met by the following algorithms—Short-Time Fourier Transform, Wavelet transform, Hilbert Hughes transform, and Empirical Mode Decomposition (EMD). An advantage of EMD is that it has the lowest computation time and complexity. FIG. 6 illustrates a comparison amongst the different algorithms or techniques. The EMD has a number of advantages and will be pursued as the signal processing technique in the overall framework of the algorithm.

The Empirical Mode Decomposition (EMD) technique eliminates several disadvantages. The decomposition is based on the direct extraction of the energy associated with various Intrinsic Mode Functions (IMFs), the most important parameters of the system. Hilbert Transform is applied to IMF's to determine the instantaneous frequencies. Thus, any event can be localized in the time as well as the frequency axes. This advantage can be used for diagnosing faults in various machines. The Hilbert Huang Transform can also be used for analyzing non-stationary signals arising out of defective rolling element bearings, with a higher efficacy than that of FFT. Compared to wavelet methods, the advantage of EMD is its adaptive characteristic, i.e., it is able to adaptively decompose any complicated time series data into a finite (and often small) number of basic functions, IMFs, and each IMF has a unique physical meaning. However, there are certain difficulties concerning the computational complexities of EMD. The decomposition method used in the EMD is called the sifting process. It makes use of cubic spline interpolation. The EMD process may take up a sifting process like linear Interpolation Moving Average or PCHIP or cubic spline interpolation.

There are various features of a proximity probe that are related to failure modes of a journal bearing. The following parameters can be used to detect the failure mode—overall RMS, gap, 1× amplitude, phase of 1×, 2× amplitude, phase of 2×, NOT 1×, and $S_{max}$. The following features can be used for finding the faults manually using ISO 7919-5—peak-peak in x-direction, peak-peak in y-direction, gap, order analysis, and $S_{max}$.

Normalization is a feature of the present disclosure. Generally, normalization is required for the following reasons. First, the algorithm can be generalized and can be applied to most of the journal bearings or compressors and/or gas turbines of different types, sizes, and capacity. Second, the algorithm should be independent of the other operating parameters that may affect the condition of a machine (even if the machine is defect free). This means that normalization will nullify the effect of operating parameters so that the measured vibration will only depend on the effect of a defective condition. This will facilitate in easier fault detection and diagnostics. Third, the algorithm can track the progress of the vibration with respect to the baseline signal by normalizing the tracking index from the generalization of the algorithm. Fourth, the algorithm can track the alert/alarm with respect to various ISO standards, API standards, or user expert based analysis. Fifth, the algorithm should compare the vibration of the various journal bearings of the plants and normalize them with respect to a fleet level average of the system.

The normalization of the vibration can be accomplished in three stages. First, there is normalization of vibration with respect to performance parameters such as power/capacity of the turbine, IGV angle, flow rate, and pressure will make the vibration independent of the performance parameter. Vibration will then depend only on defective conditions. For example, if vibration depends on the load/power, vibration normalization with respect to the power will make vibration independent of the power.

Second, there is normalization of a baseline signal with respect to fleet level thresholds. The thresholds of the features or FFT or peak/peak-peak/rms values of raw vibration can be a basis of any normalization of the baseline of a particular compressor and its journal bearing. This will help in monitoring any journal bearing with pre-existing defects.

Third, there is normalization of vibration with respect to a baseline vibration signature. For example, the features of any wind turbine will be normalized with respect to its baseline signature so that the amount of increase or decrease of features with increasing defect severity can be visualized.

Fourth, there is normalization with respect to the thresholds of the ISO/API standards so that the user can easily understand how far the operation is from the limits prescribed by the standards. Moreover, pre-existing defects (before the application/implementation of the deliverables of a system in any industry) can be easily detected.

Post-Processing Techniques have the Following Functionalities. They classify the data into normal and various failure modes. They analyze the severity of the failure mode. They include the expert's opinion on the selected features, their membership functions and thresholds/limits for fuzzy fusion techniques and weighting for Dempester Shafer fusion. They provide a single index for journal bearing by combining/integrating all the features, and they provide a single index for each failure mode.

Three techniques are discussed in this disclosure—clustering techniques (which is an unsupervised algorithm), logistic regression (a supervised algorithm), and fuzzy feature fusion. The clustering techniques are simple, and they are unsupervised algorithms and therefore don't require prior knowledge of the classifications. Logistic regression is the simplest form of the supervised algorithms and hence is used as an example in this disclosure. Fuzzy-based feature fusion has been considered that can utilize various rules and user knowledge.

Figure 7:
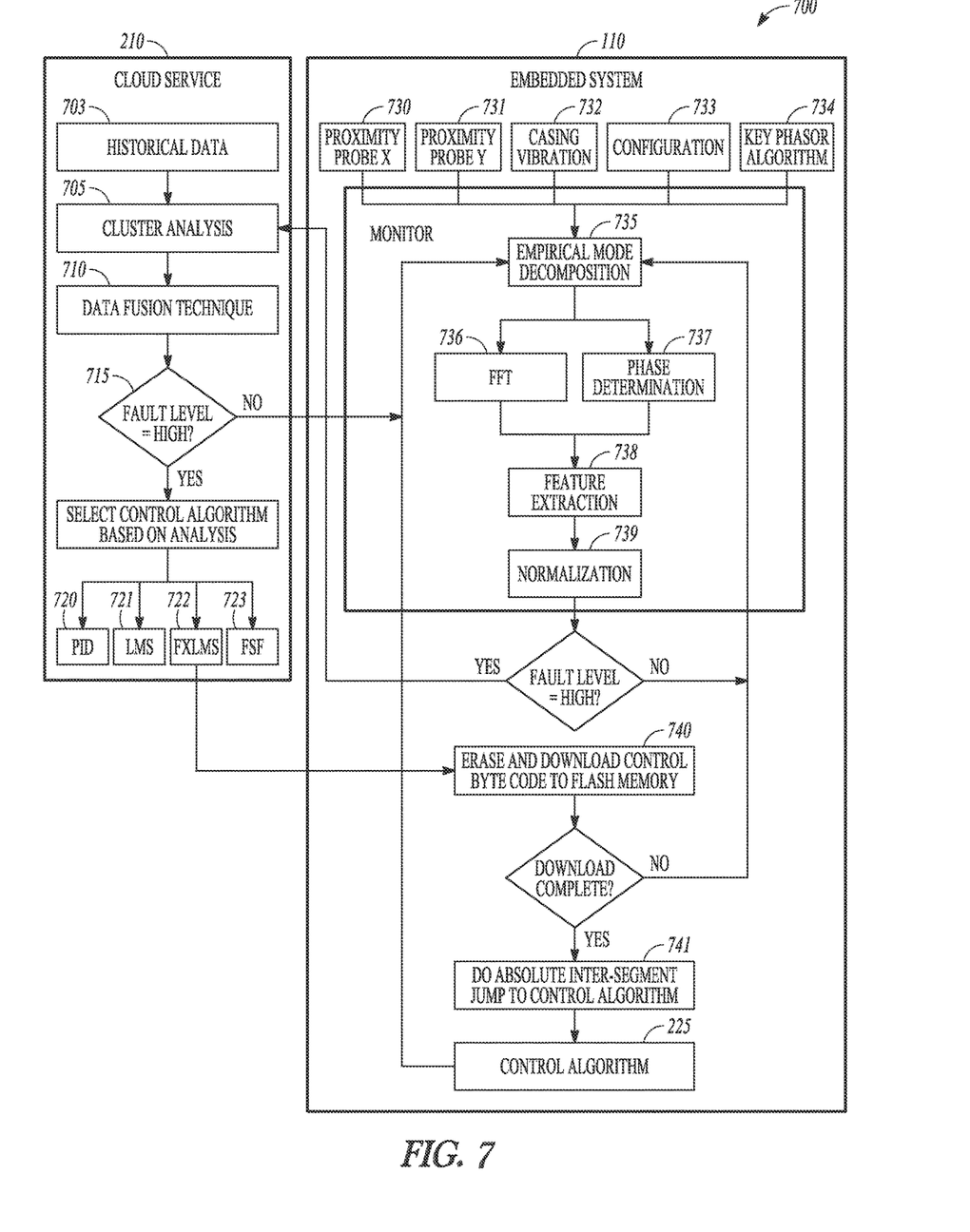
FIG. 7 is a block diagram of a control and monitoring system.

FIG. 7 is a block diagram of a control and monitoring system 700, which includes a cloud service 210 and an embedded system 110. The cloud service 210 executes a cluster analysis 705 of historical data 703 and fusion of that data at 710. If the fault level is high at 715, a control algorithm is selected based on the analysis. The control analysis can include a PID (Proportional Integral Derivative Controller) module 720, a LMS (Least Means Square filtering) module 721, an FXLMS (filtered-x LMS) module 722, and an FSF (Frequency Selective Feedback) module 723.

The embedded system 110 monitors an application using inputs from one or more of proximity probes 730, 731, casing vibration module 732, configuration module 733, and a key phasor algorithm 734, which are all input into an empirical mode decomposition module 735. The output from the empirical decomposition module 735 is input into a FFT module 736 and a phase determination module 737, whose output then serves as input into a feature extraction module 738 and normalization module 739. After the normalization module, the embedded system determines if the fault level is low or high. If it is high, then control passes back to the cluster analysis 705 in the cloud platform 210. If it is low, then control passes back to the empirical mode decomposition module 735. The embedded system further receives input from the FXLMS module 722, and control byte code is erased and then downloaded into flash memory at 740. Upon completion of the download, the embedded system executes an absolute intersegment jump 741 to the control algorithm 225.

Figure 8A:
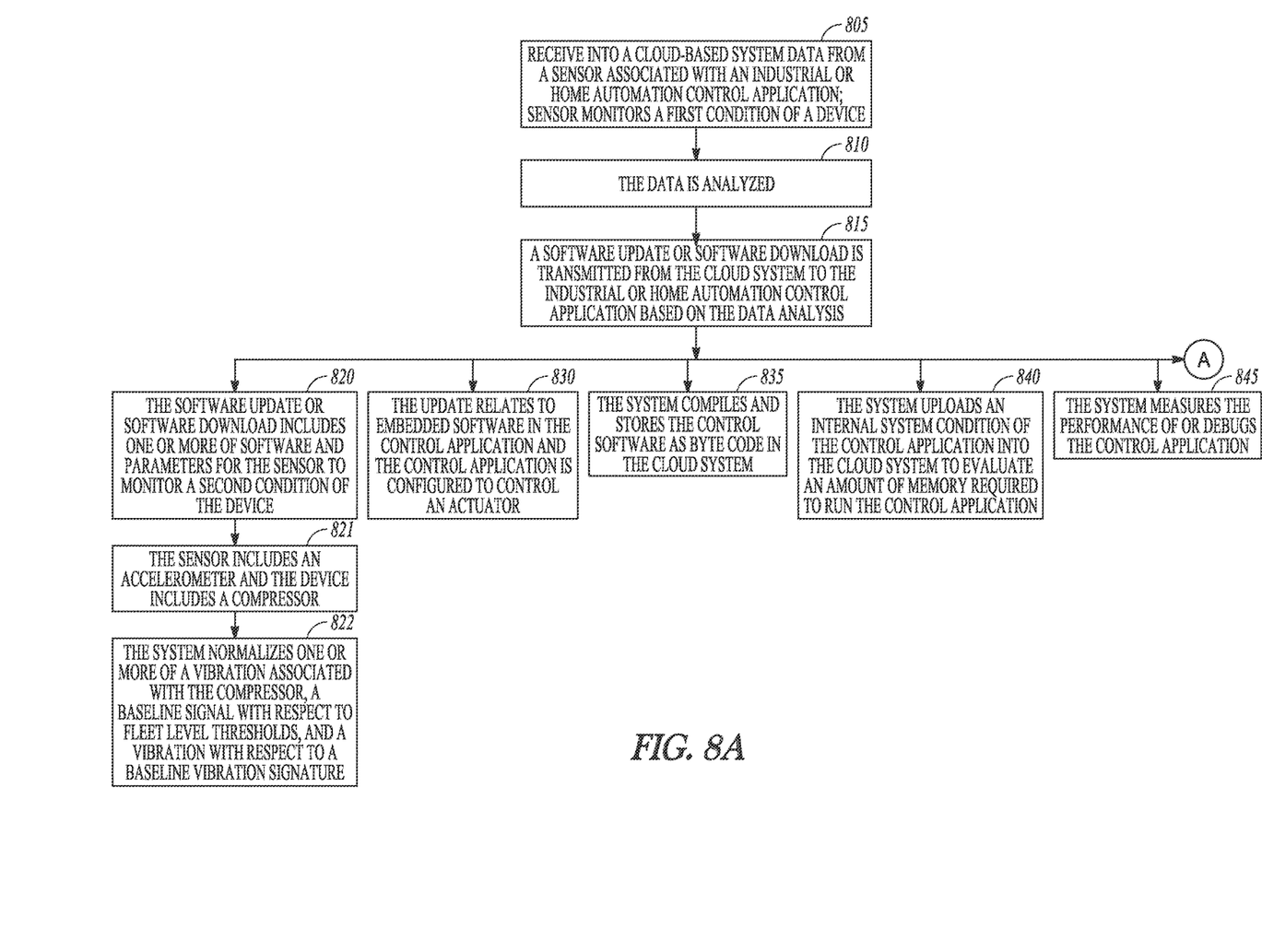
FIGS. 8A and 8B are a block diagram of operations and features of a control and monitoring system.
Figure 8B:
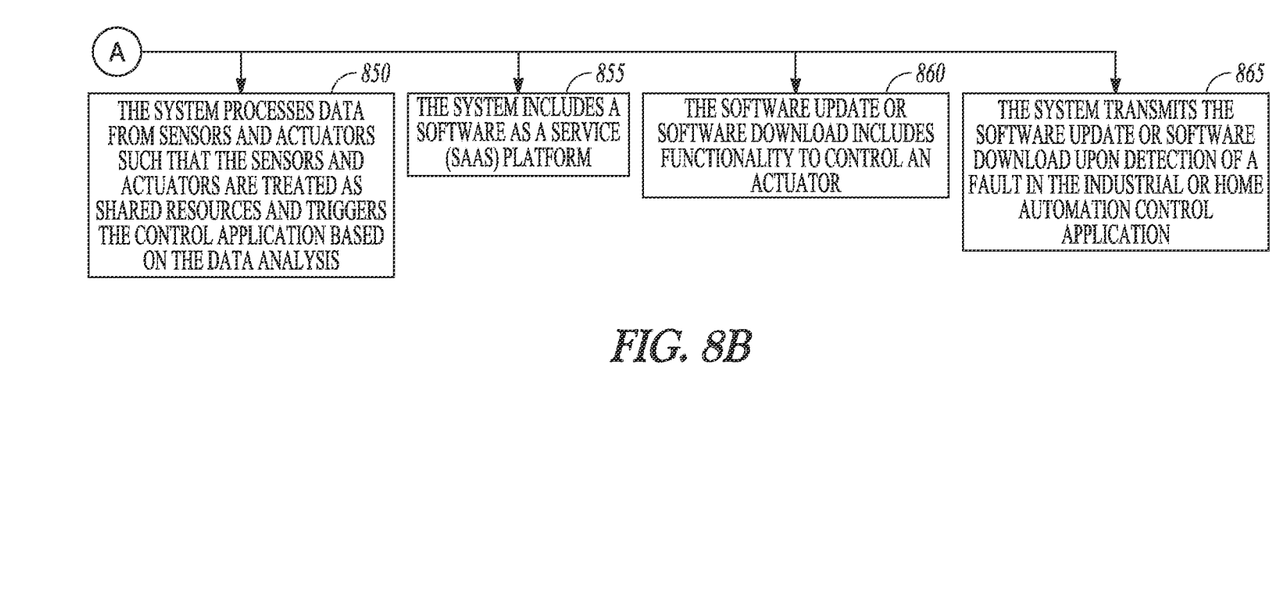

FIGS. 8A and 8B are a block diagram illustrating operations and features of a process and system for faceting search results. FIGS. 8A and 8B include a number of process blocks 805-865. Though arranged substantially serially in the examples of FIGS. 8A and 8B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 8A and 8B, at 805, a computer processor in a cloud-based system receives data from a sensor associated with an industrial or home automation control application. The sensor is configured to monitor a first condition of a device. At 810, the data is analyzed, and at 815, a software update or software download is transmitted from the cloud system to the industrial or home automation control application based on the data analysis.

At 820, the software update or software download includes one or more of software and parameters for the sensor to monitor a second condition of the device. At 821, the sensor includes an accelerometer and the device includes a compressor. The accelerometer is mounted on a drive shaft of the compressor, and the first condition includes a compressor surge and the second condition includes a bearing fault. At 822, the computer processor normalizes one or more of a vibration associated with the compressor, a baseline signal with respect to fleet level thresholds, and a vibration with respect to a baseline vibration signature.

At 830, the update relates to embedded software in the control application and the control application is configured to control an actuator. At 835, the computer processor is configured to compile and store the control software as byte code in the cloud system, thereby facilitating development of a system across multiple sites. At 840, the computer processor is configured to upload an internal system condition of the control application into the cloud system to evaluate an amount of memory required to run the control application. At 845, the computer processor is configured to measure the performance or debug the control application. At 850, the computer processor is configured to process data from sensors and actuators such that the sensors and actuators are treated as shared resources, and is configured to trigger the control application based on the data analysis, thereby reducing false alarms. At 855, the computer processor is configured as a Software as a Service (SaaS) platform. At 860, the software update or software download includes functionality to control an actuator. At 865, the computer processor is configured to transmit the software update or software download upon detection of a fault in the industrial or home automation control application.

In summary, an embodiment relates to a framework to monitor a journal bearing at failure mode level. The framework involves different types of normalization of features, automation of the failure mode level diagnostics using various indicators, combinations of various techniques to determine these indicators, and simultaneous monitoring and control using these failure mode level indicators. The disclosure is concerned with detecting faults in the journal bearing of compressors. Moreover, the disclosure also deals with active controls of the vibration generated by such failure modes of the journal bearing. A framework has been discussed and a specific arrangement is discussed in this invention.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a computer processor located within a cloud system, the computer processor configured to:
receive data from a sensor associated with an industrial or home automation control application, wherein the sensor is configured to monitor a first condition of a device;
analyze the data; and
transmit a software update or software download from the cloud system to the industrial or home automation control application based on the data analysis;
wherein the software update or software download comprises one or more of software and parameters for the sensor to monitor a second condition of the device;
wherein the sensor comprises an accelerometer, wherein the device comprises a compressor, wherein the accelerometer is mounted on a drive shaft of the compressor, and wherein the first condition comprises a compressor surge and the second condition comprises a bearing fault; and
wherein the computer processor is configured to normalize one or more of a vibration associated with the compressor, a baseline signal with respect to fleet level thresholds, a vibration with respect to a baseline vibration signature.

2. The system of claim 1, wherein the update relates to embedded software in the control application, and wherein the control application is configured to control an actuator.

3. The system of claim 1, wherein the computer processor is configured to compile and store the control application as byte code in the cloud system, thereby facilitating development of a system across multiple sites.

4. The system of claim 1, wherein the computer processor is configured to upload an internal system condition of the control application into the cloud system to evaluate an amount of memory required to run the control application.

5. The system of claim 1, wherein the computer processor is configured to measure a performance or debug the control application.

6. The system of claim 1, wherein the computer processor is configured to process data from sensors such that the sensors are treated as shared resources; and to trigger the control application based on the data analysis; thereby reducing false alarms.

7. The system of claim 1, wherein the software update or software download comprises functionality to control an actuator; and
wherein the computer processor is configured to transmit the software update or software download upon detection of a fault in the industrial or home automation control application.

8. A system comprising:
a computer processor located within a cloud system, the computer processor configured to:
receive data from a sensor associated with an industrial or home automation control application, wherein the sensor is configured to monitor a first condition of a device;
analyze the data; and
transmit a software update or software download from the cloud system to the industrial or home automation control application based on the data analysis;
wherein the software update or software download comprises one or more of software and parameters for the sensor to monitor a second condition of the device;
wherein the sensor comprises an accelerometer, wherein the device comprises a compressor, wherein the accelerometer is mounted on a drive shaft of the compressor, and wherein the first condition comprises a compressor surge and the second condition comprises a bearing fault; and
wherein the computer processor is configured to normalize one or more of a vibration associated with the compressor, a baseline signal with respect to fleet level thresholds, a vibration with respect to a baseline vibration signature.

9. The system of claim 8, wherein the update relates to embedded software in the control application, and wherein the control application is configured to control an actuator.

* * * * *